United States Patent [19]

Hirasawa et al.

[11] Patent Number: 5,379,450
[45] Date of Patent: Jan. 3, 1995

[54] RADIO LOUDSPEAKER TELEPHONE DEVICE CAPABLE OF AUTOMATICALLY PREVENTING HOWLING ON EXECUTION OF CALLING OPERATION

[75] Inventors: Naoki Hirasawa, Tokyo; Yukio Murata, Saitama, both of Japan

[73] Assignee: NEC Corporation, Tokyo, Japan

[21] Appl. No.: 967,377

[22] Filed: Oct. 28, 1992

[30] Foreign Application Priority Data

Oct. 28, 1991 [JP] Japan ................. 3-281687

[51] Int. Cl.6 .................. H04B 7/015; H04M 9/08
[52] U.S. Cl. .................. 455/54.2; 455/54.1; 455/67.3; 455/78; 379/58; 379/389; 379/390
[58] Field of Search .......... 455/78, 68, 70, 73, 455/127, 54.1, 54.2, 67.1, 67.3; 379/388, 389, 390, 58, 61, 63, 406, 410

[56] References Cited

U.S. PATENT DOCUMENTS

| 4,493,950 | 1/1985 | Lott | 379/388 |
| 4,982,425 | 1/1991 | Yoshida | 379/388 |
| 5,014,294 | 5/1991 | Kromenaker et al. | 455/70 |
| 5,054,061 | 10/1991 | Yoshida | 379/389 |

FOREIGN PATENT DOCUMENTS

| 0330384 | 2/1989 | European Pat. Off. | |
| 0114011 | 9/1979 | Japan | 379/388 |
| 0316551 | 12/1988 | Japan | 379/388 |
| 0252053 | 10/1989 | Japan | 379/390 |
| 0288145 | 11/1989 | Japan | 379/388 |
| 0067049 | 3/1990 | Japan | 379/390 |
| 2179822 | 3/1987 | United Kingdom | 379/388 |

Primary Examiner—Curtis Kuntz
Assistant Examiner—Nguyen Vo
Attorney, Agent, or Firm—Sughrue, Mion, Zinn, Macpeak & Seas

[57] ABSTRACT

In a radio loudspeaker telephone device (30) having a radio controller (18) which makes a radio transmitter (15, 17) transmit to a radio channel a dial signal representative of a destination subscriber telephone set, the radio controller produces a timing signal representative of a first time instant at which the radio controller receives a response signal through a radio receiver (16, 17) from the radio channel. The response signal indicates that the destination subscriber telephone set is not busy. A detecting circuit (33) produces a ring-back tone detection signal while the detecting circuit detects a ring-back tone signal which is received through the radio receiver from the radio channel and which indicates that the destination subscriber telephone set is called by the telephone device. A switch unit (32) usually connects a microphone (11) to the radio transmitter. A switch controller (34) makes the switch unit disconnect the radio receiver from the microphone a time duration from the first time instant of the timing signal up to a second time instant at which the ring-back tone detection signal disappears. First and second attenuating circuits may be connected between the microphone and the switch unit and between the radio receiver and the loudspeaker, respectively.

2 Claims, 5 Drawing Sheets

RADIO LOUDSPEAKER TELEPHONE DEVICE CAPABLE OF AUTOMATICALLY PREVENTING HOWLING ON EXECUTION OF CALLING OPERATION

BACKGROUND OF THE INVENTION

This invention relates to a radio loudspeaker telephone device for use in a mobile radio telephone system comprising a radio channel.

The radio loudspeaker telephone device is for carrying out communication of a speech signal with a subscriber telephone set through a radio base station and a central exchange of a central station without using a handset of the radio loudspeaker telephone device. For this purpose, the radio loudspeaker telephone device comprises a microphone for producing a microphone output speech signal and a loudspeaker for responding to a loudspeaker input speech signal.

The radio loudspeaker telephone device further comprises a hook switch, a dialing unit, a radio transmitter, and a radio receiver. When an operator of the radio loudspeaker telephone device makes the device execute calling operation, the operator puts the hook switch in an off-hook state at first to make the hook switch produce an off-hook state signal indicating that the device is put in the off-hook state. Thereafter, the operator makes the dialing unit generate a dial signal representative of a destination subscriber telephone set.

A radio controller is connected to the hook switch and the dialing unit. The radio controller controls the radio transmitter and the radio receiver in response to the off-hook state signal so that the radio transmitter transmits the dial signal to the radio channel and that the radio receiver receives a response signal from the radio channel and delivers the response signal to the radio controller. The response signal indicates that the destination subscriber telephone set is not busy.

The radio controller controls the radio transmitter and the radio receiver in response to the response signal so that the radio transmitter transmits the microphone output speech signal to the radio channel and that the radio receiver receives a ring-back tone signal from the radio channel and delivers the ring-back tone signal to the loudspeaker as the loudspeaker input speech signal. The ring-back tone signal indicates that the destination subscriber telephone set is called by the device with the destination subscriber telephone set kept in an on-hook state.

When the destination subscriber telephone set is put in an off-hook state, a loop is terminated or established which is constituted by the destination subscriber telephone set, the loudspeaker, and the microphone. However, the loop is unterminated or unestablished so far as the destination subscriber telephone set is kept in the on-hook state. Unless the loop is terminated, howling or singing inevitably occurs due to acoustical coupling between the loudspeaker and the microphone.

As will later be described, a conventional radio loudspeaker telephone device is incapable of automatically preventing the howling or the singing on execution of the calling operation.

SUMMARY OF THE INVENTION

It is therefore an object of this invention to provide a radio loudspeaker telephone device which can automatically prevent howling or singing on execution of calling operation.

Other objects of this invention will become clear as the description proceeds.

On describing the gist of an aspect of this invention, it is possible to understand that a radio loudspeaker telephone device is for use in a mobile radio telephone system comprising a radio channel. The radio loudspeaker telephone device includes: a microphone for producing a microphone output speech signal; a loudspeaker for responding to a loudspeaker input speech signal; a hook switch for producing an off-hook state signal indicating that the device is put in an off-hook state; a dialing unit for generating a dial signal representative of a destination subscriber telephone set; a radio transmitter; a radio receiver; and a radio controller connected to the hook switch and the dialing unit for controlling the radio transmitter and the radio receiver in response to the off-hook state signal so that the radio transmitter transmits the dial signal to the radio channel and that the radio receiver receives a response signal from the radio channel and delivers the response signal to the radio controller. The response signal indicates that the destination subscriber telephone set is not busy. The radio controller is for controlling the radio transmitter and the radio receiver in response to the response signal so that the radio transmitter transmits the microphone output speech signal to the radio channel and that the radio receiver receives a ring-back tone signal from the radio channel and delivers the ring-back tone signal to the loudspeaker as the loudspeaker input speech signal. The ring-back tone signal indicates that the destination subscriber telephone set is called by the device with the destination subscriber telephone set kept in an on-hook state.

According to this aspect of this invention, the radio controller of the above-understood radio loudspeaker telephone device is for detecting a first time instant at which the radio controller receives the response signal from the radio receiver. The radio controller produces a timing signal representative of the first time instant. The above-understood radio loudspeaker telephone device comprises: a switch unit located between the microphone and the radio transmitter and having an on state and an off state for connecting the microphone to the radio transmitter at the on state to supply the microphone output speech signal to the radio transmitter and for disconnecting from the microphone the radio transmitter at the off state to stop supply of the microphone output speech signal to the radio transmitter; a ring-back tone detecting circuit connected to the radio receiver for detecting the ring-back tone signal to produce a ring-back tone detection signal while the ring-back tone detecting circuit detects the ring-back tone signal; and a switch controller connected to the radio controller and the ring-back tone detecting circuit for controlling the switch unit so that the switch unit is put in the off state a time duration from the first time instant of the timing signal up to a second time instant at which the ring-back tone detection signal disappears. The switch controller is for controlling the switch unit so that the switch unit is put in the on state at any time except the time duration.

On describing the gist of a different aspect of this invention, it is possible to understand that a radio loudspeaker telephone device is for use in a mobile radio telephone system comprising a radio channel. The radio loudspeaker telephone device includes: a microphone for producing a microphone output speech signal; first attenuating means connected to the microphone for attenuating the microphone output speech signal to produce a first attenuated speech signal; a loudspeaker for responding to a loudspeaker input speech signal; second attenuating means for attenuating an attenuator input speech signal to produce a second attenuated speech signal which is for use as the loudspeaker input speech signal; a hook switch for producing an off-hook state signal indicating that the device is put in an off-hook state; a dialing unit for generating a dial signal representative of a destination subscriber telephone set; a radio transmitter; a radio receiver; and a radio controller connected to the hook switch and the dialing unit for controlling the radio transmitter and the radio receiver in response to the off-hook state signal so that the radio transmitter transmits the dial signal to the radio channel and that the radio receiver receives a response signal from the radio channel and delivers the response signal to the radio controller. The response signal indicates that the destination subscriber telephone set is not busy. The radio controller is for controlling the radio transmitter and the radio receiver in response to the response signal so that the radio transmitter transmits the first attenuated speech signal to the radio channel and that the radio receiver receives a ring-back tone signal from the radio channel and delivers the ring-back tone signal to the second attenuating means as the attenuator input speech signal. The ring-back tone signal indicates that the destination subscriber telephone set is called by the device with the destination subscriber telephone set kept in an on-hook state.

According to the different aspect of this invention, the radio controller of the above-understood radio loudspeaker telephone device is for detecting a first time instant at which the radio controller receives the response signal from the radio receiver. The radio controller produces a timing signal representative of the first time instant. The above-understood radio loudspeaker telephone device comprises: a switch unit located between the first attenuating means and the radio transmitter and having an on state and an off state for connecting the first attenuating means to the radio transmitter at the on state to supply the first attenuated speech signal to the radio transmitter and for disconnecting from the first attenuating means the radio transmitter to stop supply of the first attenuated speech signal to the radio transmitter; a ring-back tone detecting circuit connected to the radio receiver for detecting the ring-back tone signal to produce a ring-back tone detection signal while the ring-back tone detecting circuit detects the ring-back tone signal; and a switch controller connected to the radio controller and the ring-back tone detecting circuit for controlling the switch unit so that the switch unit is put in the off state a time duration from the first time instant of the timing signal up to a second time instant at which the ring-back tone detection signal disappears. The switch controller is for controlling the switch unit so that the switch unit is put in the on state at any time except the time duration.

DESCRIPTION OF THE PREFERRED EMBODIMENT

Figure 1:
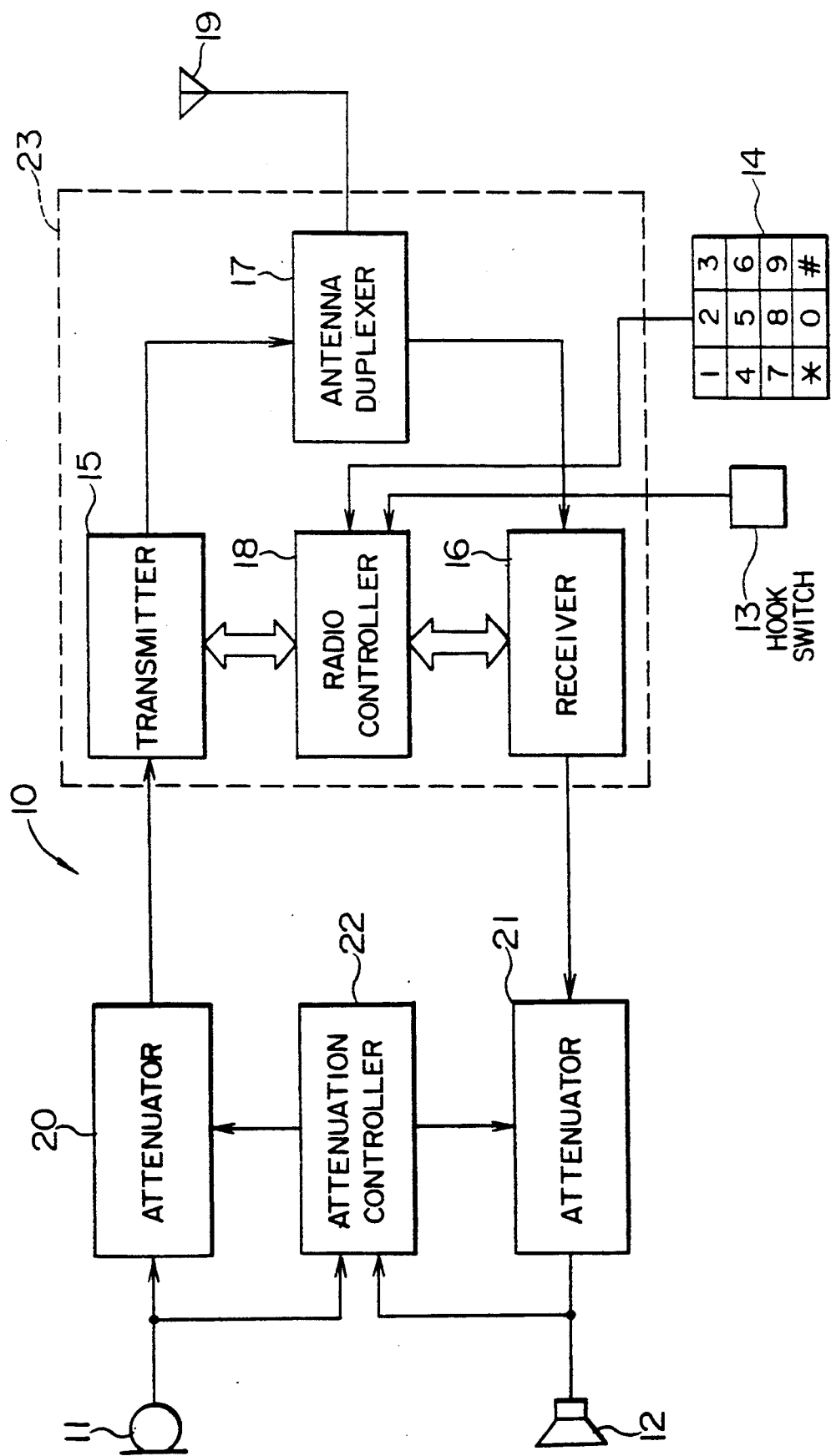
FIG. 1 is a block diagram of a conventional radio loudspeaker telephone device.

Referring to FIG. 1, a conventional radio loudspeaker telephone device 10 will be described at first for a better understanding of this invention. The conventional radio loudspeaker telephone device 10 is equivalent to a radio loudspeaker telephone device described in the preamble of the instant specification.

The conventional radio loudspeaker telephone device 10 is for use in a mobile radio telephone system comprising a radio channel. The radio loudspeaker telephone device 10 is for carrying out communication of a speech signal with a destination subscriber telephone set through a radio base station and a central exchange of a central station. The destination subscriber telephone set, the radio base station, and the central exchange are later illustrated.

The radio loudspeaker telephone device 10 comprises a microphone 11 for producing a microphone output speech signal and a loudspeaker 12 for responding to a loudspeaker input speech signal. When an operator of the radio loudspeaker telephone device 10 makes the radio loudspeaker telephone device 10 execute calling operation, the operator puts a hook switch 13 in an off state at first to make the hook switch 13 produce an off-hook state signal indicating that the radio loudspeaker telephone device 10 is put in the off-hook state. Thereafter, the operator makes a dialing unit 14 generate a dial signal representative of the destination subscriber telephone set.

The radio loudspeaker telephone device 10 further comprises a transmitter 15, a receiver 16, and an antenna duplexer 17. A combination of the transmitter 15 and a part of the antenna duplexer 17 is referred to as a radio transmitter. A combination of the receiver 16 and another part of the antenna duplexer 17 is called a radio receiver.

A radio controller 18 is connected to the hook switch 13 and the dialing unit 14. The radio controller 18 controls the transmitter 15 and the receiver 16 in response to the off-hook state signal so that the transmitter 15 transmits the dial signal to the radio channel through the antenna duplexer 17 and an antenna 19 and that the receiver 16 receives a response signal from the radio channel through the antenna 19 and the antenna duplexer 17 and delivers the response signal to the radio controller 18. The response signal indicates that the destination subscriber telephone set is not busy.

The radio controller 18 controls the transmitter 15 and the receiver 16 in response to the response signal so that the transmitter 15 transmits the microphone output speech signal to the radio channel and that the receiver 16 receives a ring-back tone signal from the radio channel and delivers the ring-back tone signal to the loudspeaker 12 as the loudspeaker input speech signal. The ring-back tone signal indicates that the destination subscriber telephone set is called by the device 10 with the destination subscriber telephone set kept in an on-hook state.

In a practical use, a first variable attenuator 20 is connected between the microphone 11 and the transmitter 15. Furthermore, a second variable attenuator 21 is connected between the receiver 16 and the loudspeaker 12. Connected to the microphone 11 and the loudspeaker 12, an attenuation controller 22 controls the attenuators 20 and 21 so that the attenuator 21 has a large attenuation when the microphone output speech signal is larger in signal level than the loudspeaker input speech signal and that the attenuator 20 has a large attenuation when the loudspeaker input speech is larger in signal level than the microphone output speech signal. As a result, the first variable attenuator 20 attenuates the microphone output speech signal as a first attenuated speech signal which is delivered to the transmitter 15 as the microphone output signal. The second variable attenuator 21 attenuates, as a second attenuated speech signal, an attenuator input speech signal delivered from the receiver 16. The second attenuated speech signal is for use as the loudspeaker input speech signal of the loudspeaker 12.

Thus, the first variable attenuator 20 serves in cooperation with the attenuation controller 22 as a first attenuating circuit connected to the microphone 11. The first attenuating circuit attenuates the microphone output speech signal and produces the first attenuated speech signal. The second variable attenuator 21 acts in cooperation with the attenuation controller 22 as a second attenuating circuit. The second attenuating circuit attenuates the attenuator input speech signal and produces the second attenuated speech signal which is for use as the loudspeaker input speech signal.

A combination of the attenuators 20 and 21 and the attenuation controller 22 can prevent howling or singing due to acoustical coupling between the loudspeaker 12 and the microphone 11 when a loop is terminated by the destination subscriber telephone set which is put in an off-hook state. The loop will presently become clear. However, inasmuch as the loop is unterminated so far as the destination subscriber telephone set is kept in the on-hook state, howling unavoidably occurs due to the acoustical coupling resulting from a side tone of the destination subscriber telephone set.

Thus, the radio loudspeaker telephone device 10 can not automatically prevent the howling or singing on carrying out the calling operation. In FIG. 1, the transmitter 15, the receiver 16, the antenna duplexer 17 constitute a radio section 23.

Figure 2:
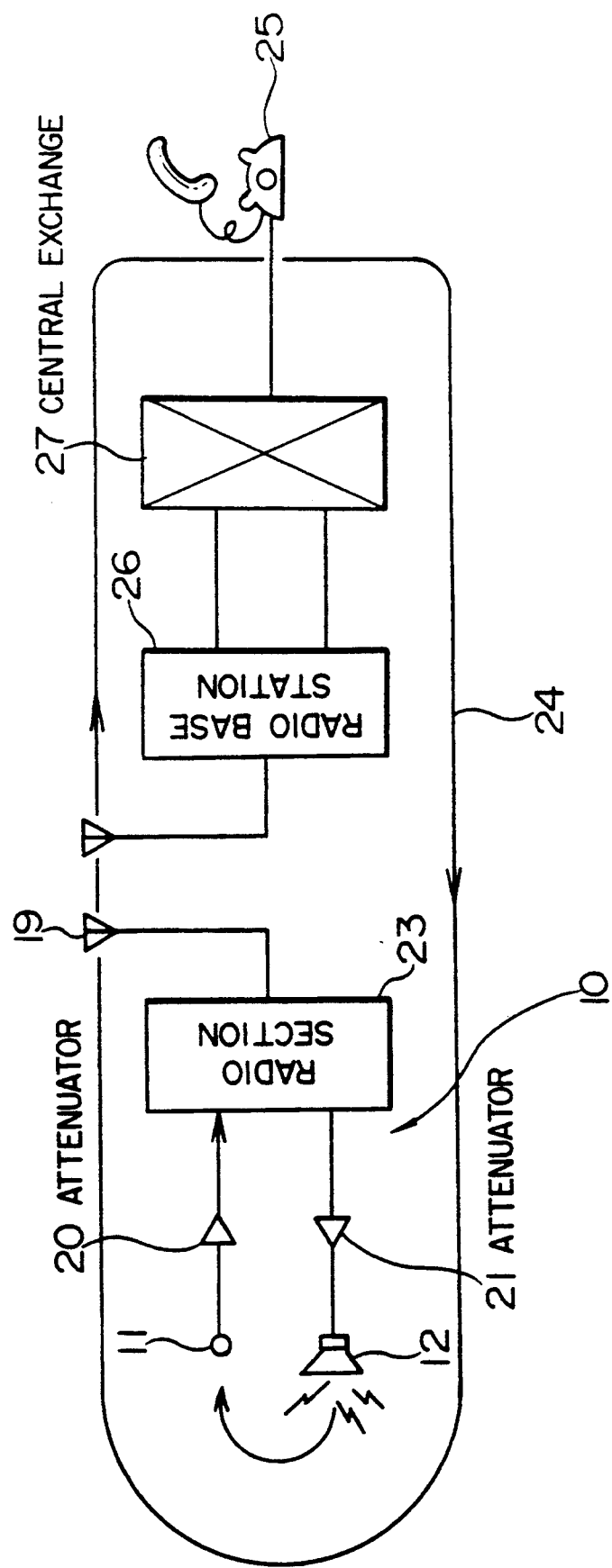
FIG. 2 is a diagram for use in describing a loop between the radio loudspeaker telephone device of FIG. 1 and a destination subscriber telephone set.

Turning to FIG. 2, the loop is designated by a reference numeral 24. The loop 24 is terminated when the destination subscriber telephone set designated by another reference numeral 25 is put in the off-hook state. The radio station and the central exchange are designated by reference numerals 26 and 27, respectively. Merely for convenience, the hook switch 13 (FIG. 1), the dialing unit 14 (FIG. 1), and the attenuation controller 22 (FIG. 1) are not shown in FIG. 2.

Figure 3:
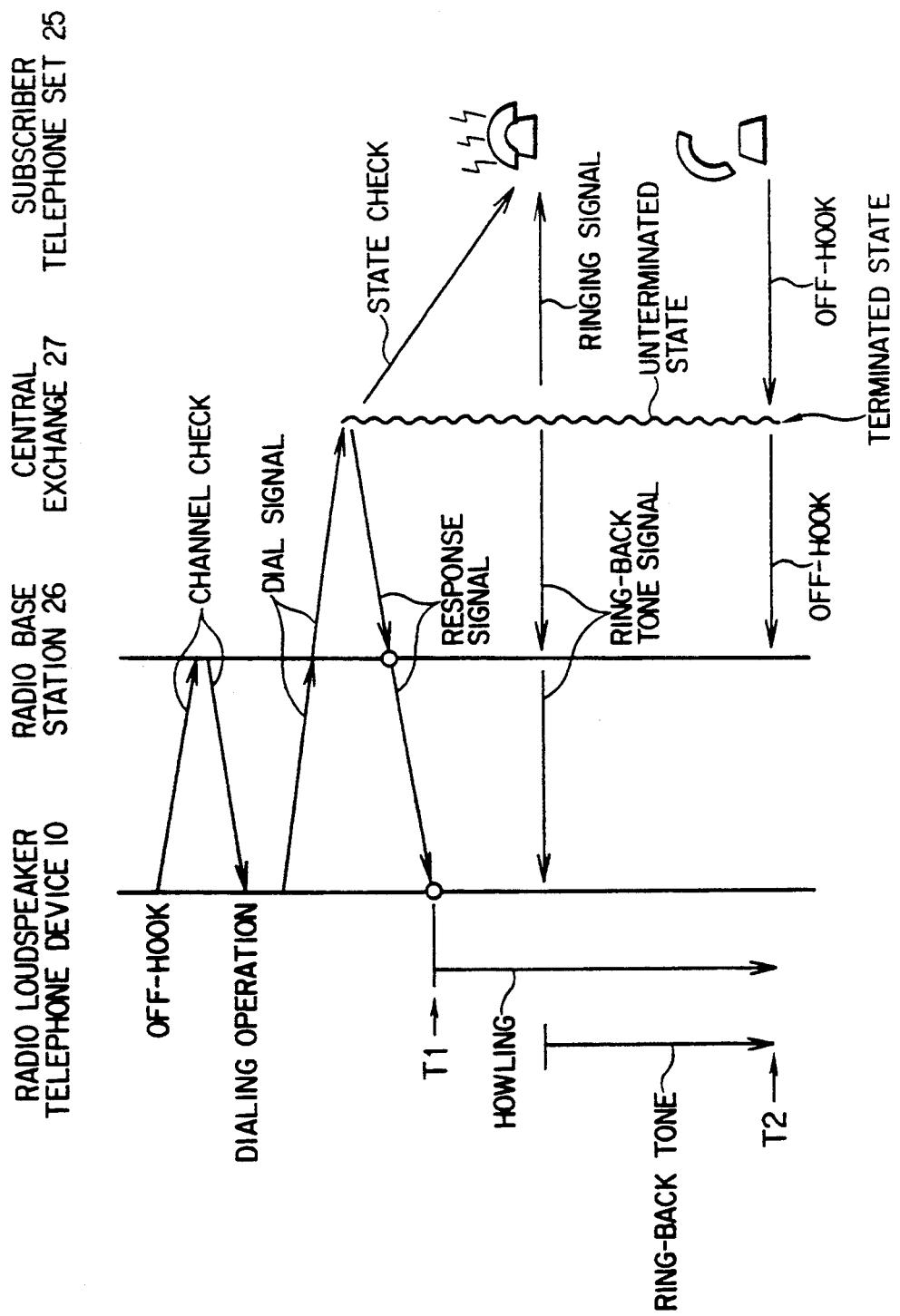
FIG. 3 is a diagram for use in describing operation of the radio loudspeaker telephone device illustrated in FIG. 1.

Turning to FIG. 3, the calling operation of the radio loudspeaker telephone device 10 will be described more in detail. When the radio loudspeaker telephone device 10 is put in the off-hook state, the radio loudspeaker telephone device 10 checks the radio channel and confirms that the radio channel is a normal. In this event, the radio base station 26 transmits a dial tone signal to the radio channel. The radio loudspeaker telephone device 10 receives the dial tone signal from the radio channel and returns the dial signal to the radio base station through radio channel.

When the dial signal indicative of the destination subscriber telephone set 25 is transmitted from the radio loudspeaker telephone device 10 to the radio base station 26 through the radio channel by dialing operation of the operator by the use of the dialing unit 14 (FIG. 1), the radio base station 26 receives the dial signal and delivers the dial signal to the central exchange 27 of the central station. The central exchange 27 checks a state of the destination subscriber telephone set 25. When the destination subscriber telephone set 25 is not busy, the central exchange 27 delivers the response signal to the radio loudspeaker telephone device 10 through the radio base station 26. After transmission of the response signal, the central exchange 27 transmits a ringing signal to the destination subscriber telephone device 25. Simultaneously, the central exchange 27 transmits the ring-back tone signal to the radio loudspeaker telephone device 10 through the radio base station 26.

In FIGS. 1 and 3, the receiver 16 is operatively connected to the attenuator 21 under control of the radio controller 18 after the radio controller 18 receives the response signal from the receiver 16. Therefore, the loudspeaker 12 can receive the ring-back tone signal through the antenna duplexer 17, the receiver 16, and the attenuator 21 and generates a ring-back tone. In this event, howling occurs due to the acoustical coupling caused by the side tone of the destination subscriber telephone set 25 after the radio controller 18 receives the response signal. The howling is maintained until the destination subscriber telephone set 25 is put in the off-hook state as mentioned above. When the destination subscriber telephone set 25 is put in the off-hook state, the central exchange 27 stops transmission of the ring-back tone signal to the destination subscriber telephone set 25. As a result, the ring-back tone disappears.

Figure 4:
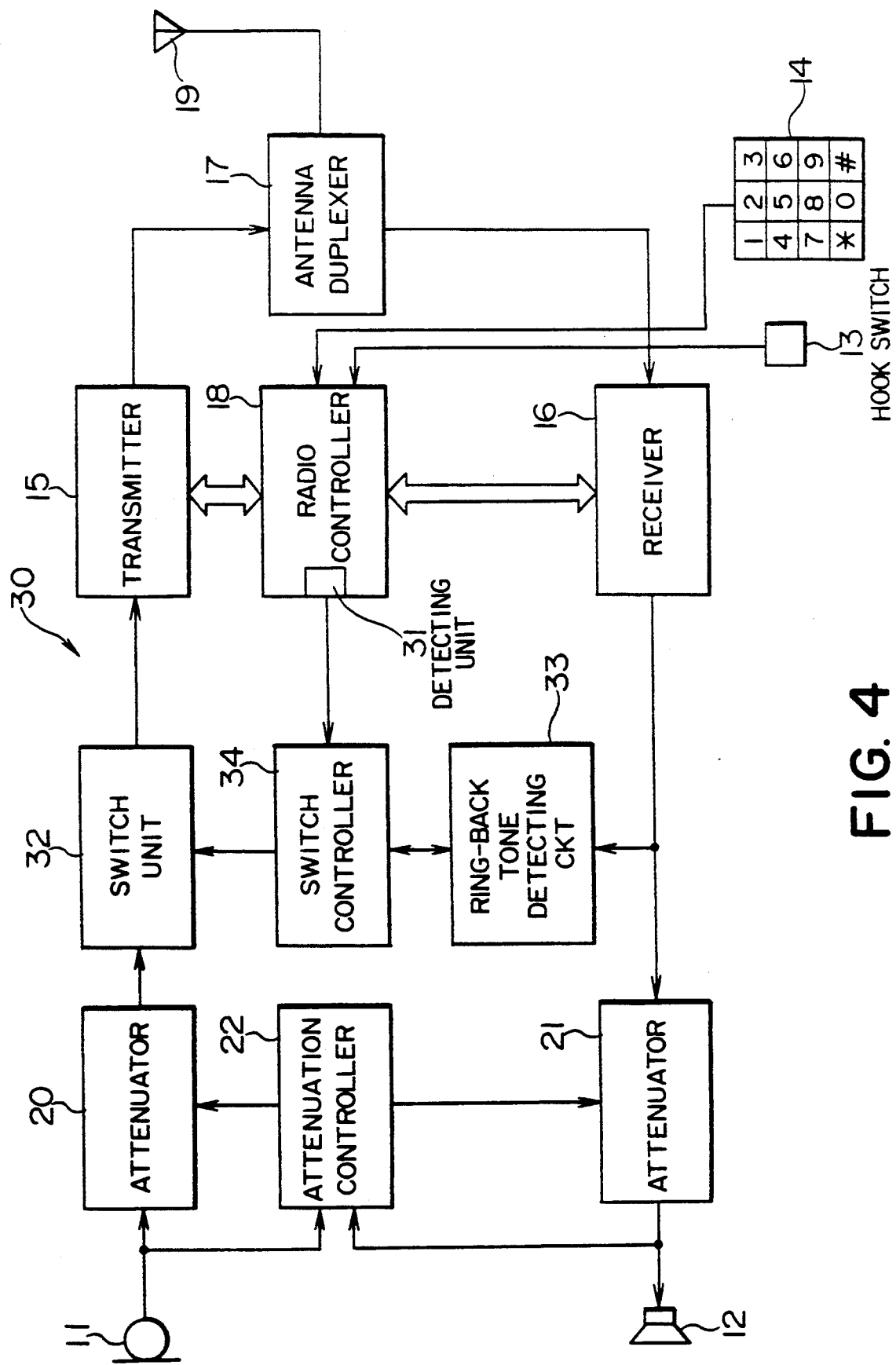
FIG. 4 is a block diagram of a radio loudspeaker telephone device according to an embodiment of this invention.

Turning to FIG. 4, a radio loudspeaker telephone device 30 according to a preferred embodiment of this invention is similar to the radio loudspeaker telephone device 10 of FIG. 1 except for the following. The radio controller 18 comprises a detecting unit 31 which detects a first time instant at which the controller 18 receives the response signal from the receiver 16. The detecting unit 31 thereby produces a timing signal representative of the first time instant. The first time instant is designated by T1 in FIG. 3.

In FIG. 4, the radio loudspeaker telephone device 30 comprises a switch unit 32 located between the attenuator 20 and the transmitter 15 and having an on state and an off state. The switch unit 32 connects the attenuator 20 to the transmitter 15 at the on state to supply the microphone output speech signal to the transmitter 15. The switch unit 32 disconnects from the attenuator 20 the transmitter 15 at the off state to stop supply of the microphone output speech signal to the transmitter 15.

Connected to the receiver 16, a ring-back tone detecting circuit 33 detects the ring-back tone signal to produce a ring-back tone detection signal.

A switch controller 34 is connected to the detecting unit 31 of the radio controller 18 and to the ring-back tone detecting circuit 33. The switch controller 34 controls the switch unit 32 so that the switch unit 32 is put in the off state a time duration from the first time instant T1 of the timing signal up to a second time instant at which the ring-back tone detection signal disappears.

The second time instant is designated by T2 in FIG. 3. The switch controller 34 controls the switch unit 32 so that the switch unit 32 is put in the on state at any time except the time duration.

Thus, the radio loudspeaker telephone device 30 of FIG. 4 can automatically prevent howling or singing on execution of the calling operation.

Figure 5:
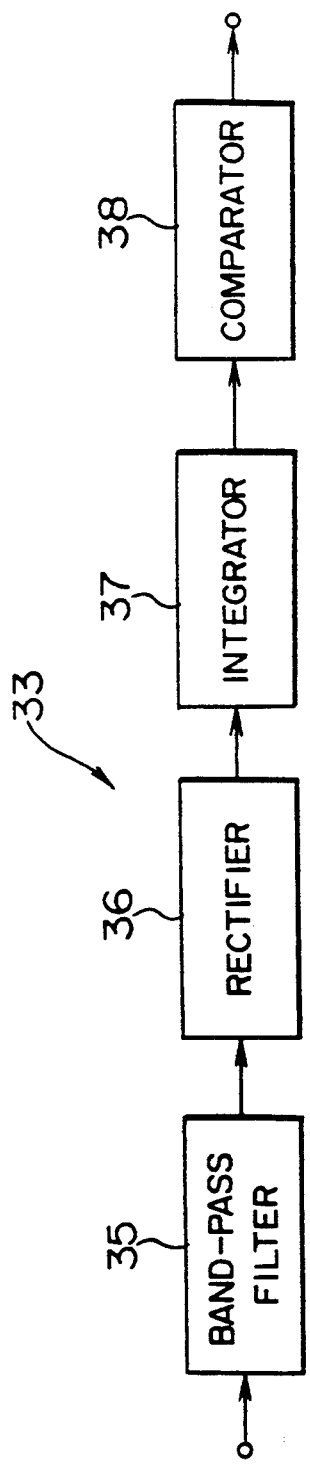
FIG. 5 is a block diagram of a ring-back tone detecting circuit used in the radio loudspeaker telephone device illustrated in FIG. 4.

Turning to FIG. 5, the ring-back tone detecting circuit 33 comprises a band-pass filter 35 of, for example, a Biquad filter. The band-pass filter 35 selectively outputs a frequency band including a fundamental frequency of the ring-back tone signal. A rectifier 36 converts an output signal of the band-pass filter 35 into a DC voltage. An integrator 37 integrates the DC voltage and produces a smoothed voltage. A comparator 38 compares the smoothed voltage with a predetermined level and produces a digital waveform signal of a logic "1" level and a logic "0" level as the ring-back tone detection signal.

Figure 6:
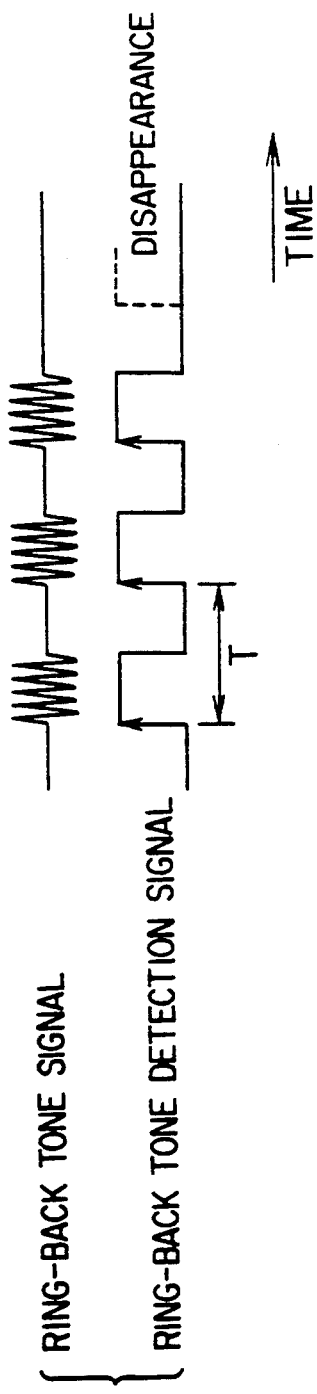
FIG. 6 is a signal format for use in describing operation of the ring-back tone detecting circuit illustrated in FIG. 5.

Turning to FIG. 6, the ring-back tone signal is illustrated along a first row. The ring-back tone detection signal is illustrated along a second row. Disappearance of the ring-back tone detection signal can be found in various manners. For example, a timer is used which times a preselected time interval in response to a leading edge of the ring-back tone detection signal. The preselected time interval is longer than a repetition period T of the ring-back tone detection signal. The timer produces a time-out signal when the timer times the preselected time interval. When a following leading edge appears before the timer times the preselected time interval, the timer is reset and again times the preselected time interval in response to the following leading edge. The time-out signal indicates the disappearance of the ring-back tone detection signal.

What is claimed is:

1. A radio loudspeaker telephone device for use in a mobile radio telephone system comprising a radio channel, said radio loudspeaker telephone device including:
   a microphone for producing a microphone output speech signal;
   a loudspeaker for responding to a loudspeaker input speech signal;
   a hook switch for producing an off-hook state signal indicating that said device is put in an off-hook state;
   a dialing unit for generating a dial signal representative of a designation subscriber telephone set;
   a radio transmitter;
   a radio receiver; and
   a radio controller connected to said hook switch and said dialing unit for controlling said radio transmitter and said radio receiver in response to said off-hook state signal so that said radio transmitter transmits said dial signal to said radio channel and that said radio receiver receives a response signal from said radio channel and delivers said response signal to said radio controller, said response signal indicating that said destination subscriber telephone set is not busy, said radio controller being for controlling said radio transmitter and said radio receiver in response to said response signal so that said radio transmitter transmits said microphone output speech signal to said radio channel and that said radio receiver receives a ring-back tone signal from said radio channel and delivers said ring-back tone signal to said loudspeaker as said loudspeaker input speech signal, said ring-back tone signal indicating that said destination subscriber telephone set is called by said device with said destination subscriber telephone set kept in an on-hook state;

wherein:
   said radio controller is for detecting a first time instant at which said radio controller receives said response signal from said radio receiver, said radio controller producing a timing signal representative of said first time instant;

said device comprising:
   a switch unit located between said microphone and said radio transmitter and having an on state and an off state for connecting said microphone to said radio transmitter at said on state to supply said microphone output speech signal to said radio transmitter and for disconnecting from said microphone said radio transmitter at said off state to stop supply of said microphone output speech signal to said radio transmitter;
   a ring-back tone detecting circuit connected to said radio receiver for detecting said ring-back tone signal to produce a ring-back tone detection signal while said ring-back tone detecting circuit detects said ring-back tone signal; and
   a switch controller connected to said radio controller and said ring-back tone detecting circuit for controlling said switch unit so that said switch unit is put in said off state a time duration from said first time instant of said timing signal up to a second time instant at which said ring-back tone detection signal disappears, said switch controller being for controlling said switch unit so that said switch unit is put in said on state at any time except said time duration;

said ring-back tone detecting circuit comprises:
   a band-pass filter connected to said radio receiver for selectively outputting a frequency band including a fundamental frequency of said ring-back tone signal;
   a rectifier connected to said band-pass filter for converting an output signal of said band-pass filter into a DC voltage;
   an integrator connected to said rectifier for integrating said DC voltage to produce a smoothed voltage; and
   a comparator connected to said integrator for comparing said smoothed voltage with a predetermined level to produce a digital waveform signal of a logic "1" level and a logic "0"level as said ring-back tone detection signal.

2. A radio loudspeaker telephone device for use in a mobile radio telephone system comprising a radio channel, said radio loudspeaker telephone device including:
   a microphone for producing a microphone output speech signal;
   first attenuating means connected to said microphone for attenuating said microphone output speech signal to produce a first attenuated speech signal;
   a loudspeaker for responding to a loudspeaker in put speech signal;
   second attenuating means for attenuating an attenuator input speech signal to produce a second attenuated speech signal which is for use as said loudspeaker input speech signal;
   a hook switch for producing an off-hook state signal indicating that said device is put in an off-hook state;

a dialing unit for generating a dial signal representative of a destination subscriber telephone set;

a radio transmitter;

a radio receiver;

a radio controller connected to said hook switch and said dialing unit for controlling said radio transmitter and said radio receiver in response to said off-hook state signal so that said radio transmitter transmits said dial signal to said radio channel and that said radio receiver receives a response signal from said radio channel and delivers said response signal to said radio controller, said response signal indicating that said destination subscriber telephone set is not busy, said radio controller being for controlling said radio transmitter and said radio receiver in response to said response signal so that said radio transmitter transmits said first attenuated speech signal to said radio channel and that said radio receiver receives a ring-back tone signal from said radio channel and delivers said ring-back tone signal to said second attenuating means as said attenuator input speech signal, said ring-back tone signal indicating that said destination subscriber telephone set is called by said device with said destination subscriber telephone set kept in an on-hook state;

wherein:

said radio controller is for detecting a first time instant at which said radio controller receives said response signal from said radio receiver, said radio controller producing a timing signal representative of said first time instant;

said device comprising:

a switch unit located between said first attenuating means and said radio transmitter and having an on state and an off state for connecting said first attenuating means to said radio transmitter at said on state to supply said first attenuated speech signal to said radio transmitter and for disconnecting from said first attenuating means said radio transmitter to stop supply of said first attenuated speech signal to said radio transmitter;

a ring-back tone detecting circuit connected to said radio receiver for detecting said ring-back tone signal to produce a ring-back tone detection signal while said ring-back tone detecting circuit detects said ring-back tone signal; and a switch controller connected to said radio controller and said ring-back tone detecting circuit for controlling said switch unit so that said switch unit is put in the off state a time duration from said first time instant of said timing signal up to a second time instant at which said ring-back tone detection signal disappears, said switch controller being for controlling said switch unit so that said switch unit is put in said on state at any time except said time duration;

said ring-back tone detecting circuit comprises:

a band-pass filter connected to said radio receiver for selectively outputting a frequency band including a fundamental frequency of said ring-back tone signal;

a rectifier connected to said band-pass filter for converting an output signal of said band-pass filter into a DC voltage;

an integrator connected to said rectifier for integrating said DC voltage to produce a smoothed voltage; and a comparator connected to said integrator for comparing said smoothed voltage with a predetermined level to produce a digital waveform signal of a logic "1" level and a logic "0" level as said ring-back tone detection signal.

* * * * *